Dec. 10, 1929.  O. KLEINSCHMIT  1,738,586
SIGNATURE GATHERING AND STITCHING MACHINE
Filed Sept. 15, 1927  7 Sheets-Sheet 1
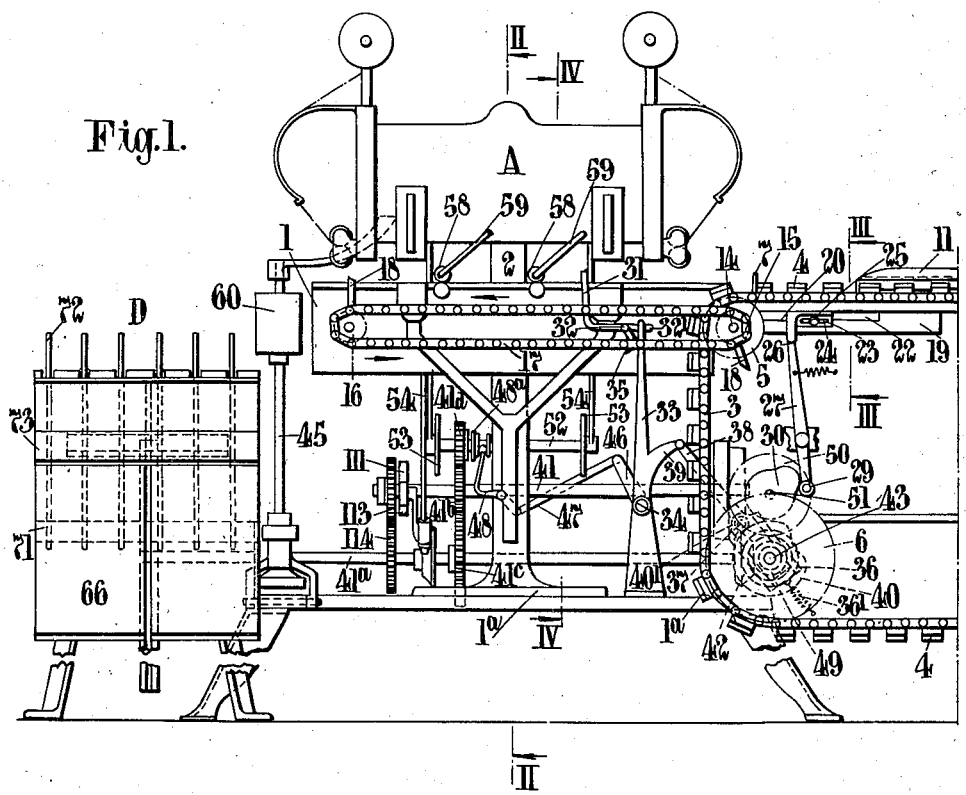
Fig.1.
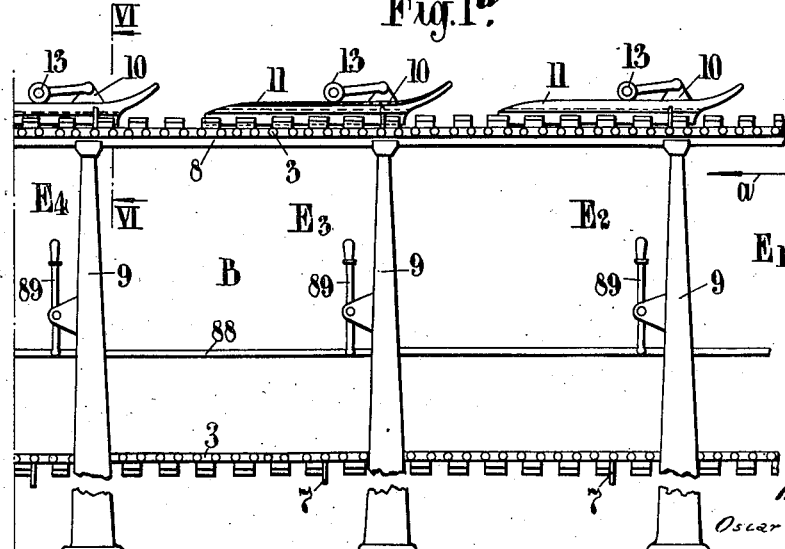
Fig.1<sup>a</sup>
INVENTOR:
Oscar Kleinschmit
BY
ATTORNEY Dec. 10, 1929.  O. KLEINSCHMIT  1,738,586
SIGNATURE GATHERING AND STITCHING MACHINE
Filed Sept. 15, 1927  7 Sheets-Sheet 2
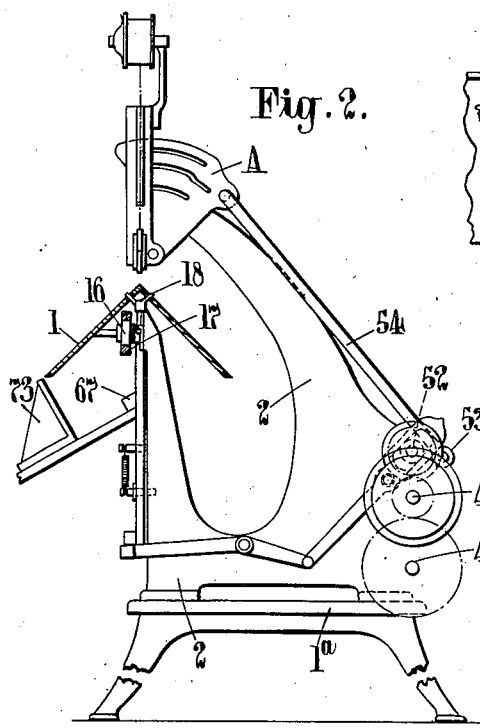
Fig. 2.
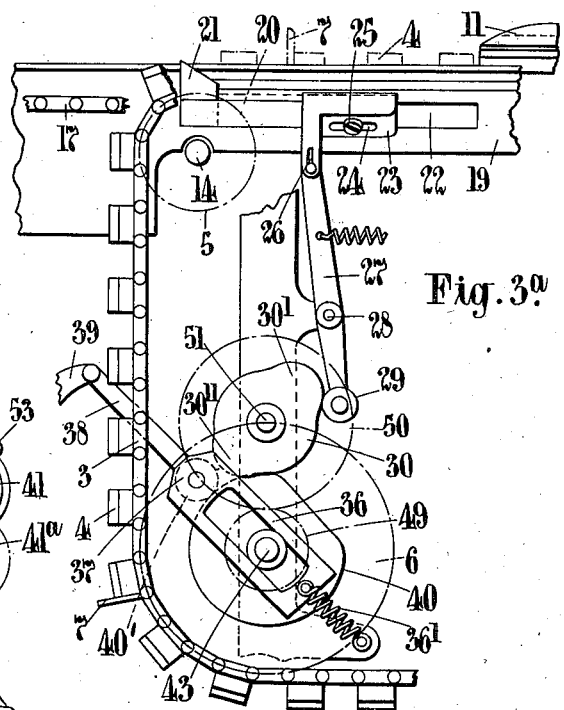
Fig. 3ª.
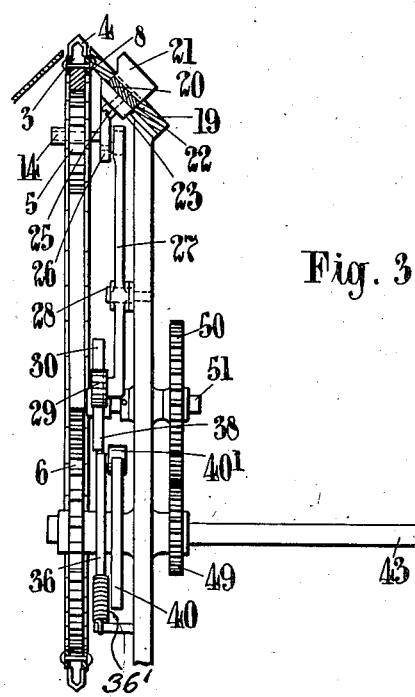
Fig. 3.
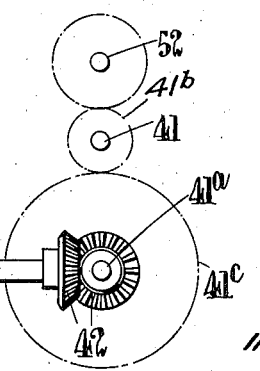
INVENTOR:
Oscar Kleinschmit
BY
ATTORNEY Dec. 10, 1929.　　　O. KLEINSCHMIT　　　1,738,586
SIGNATURE GATHERING AND STITCHING MACHINE
Filed Sept. 15, 1927　　　7 Sheets-Sheet 3
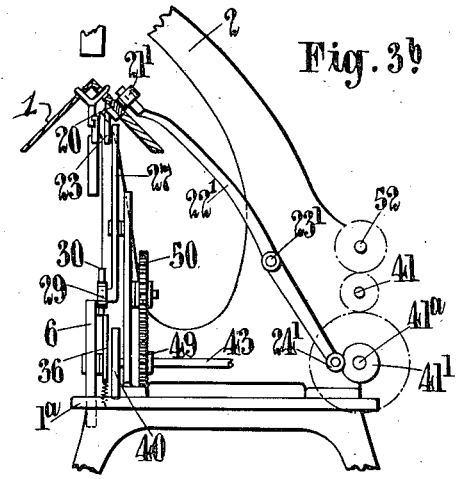
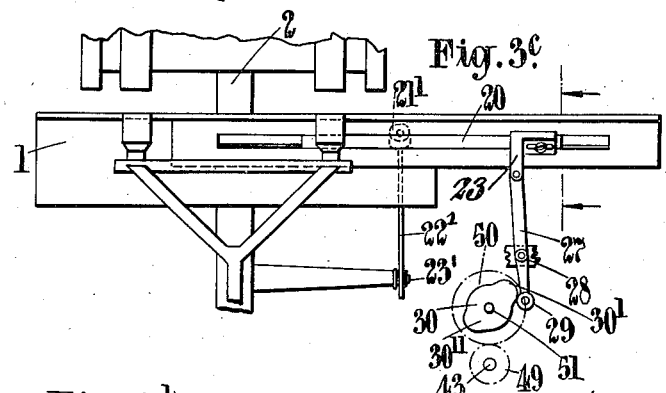
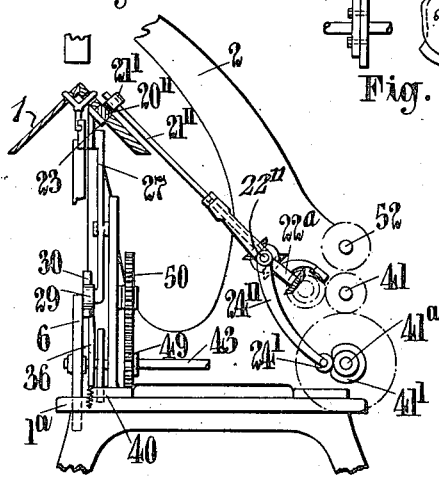
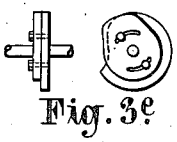
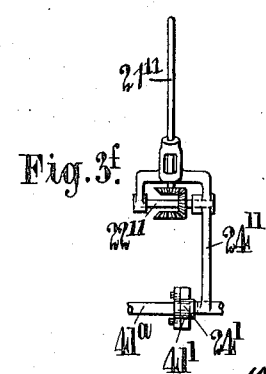
INVENTOR:
Oscar Kleinschmit
BY
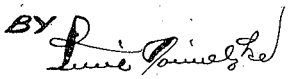
ATTORNEY

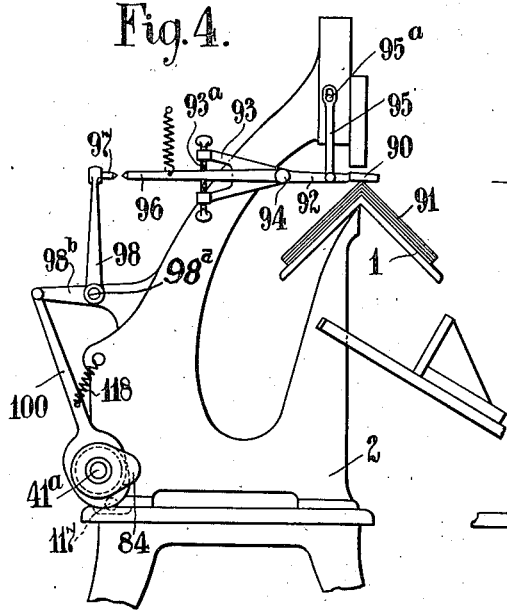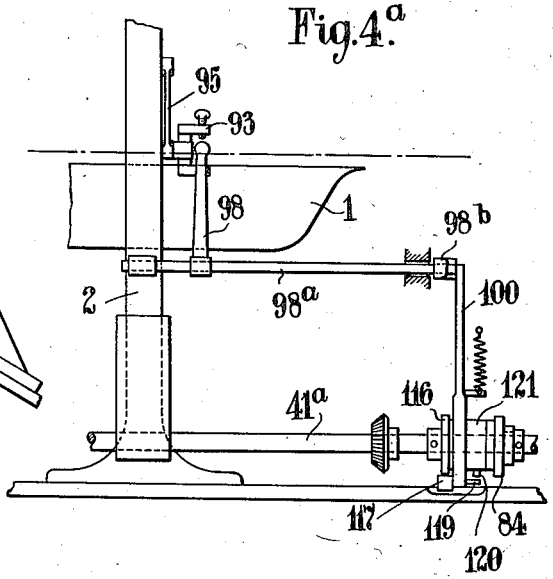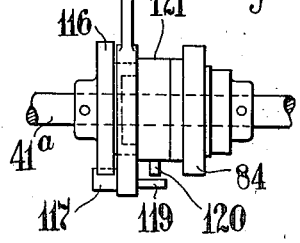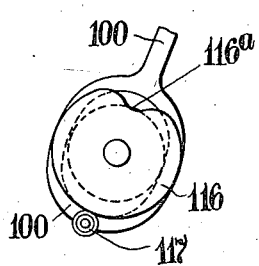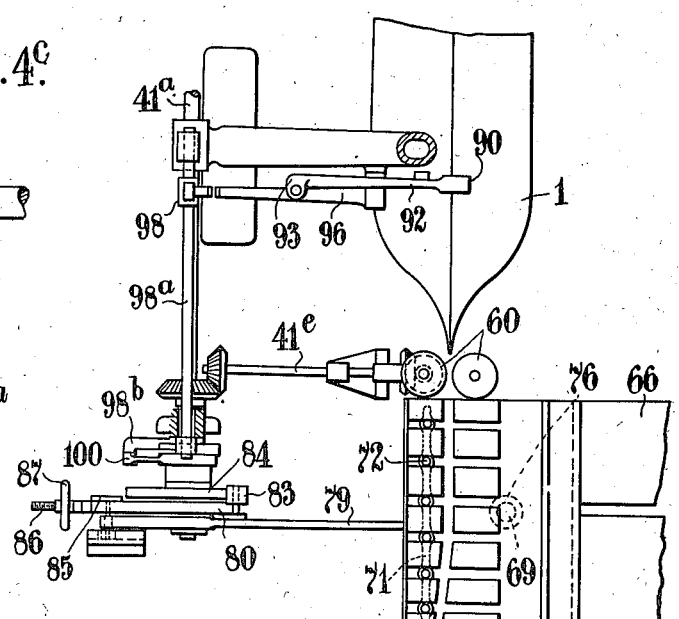

Dec. 10, 1929.  O. KLEINSCHMIT  1,738,586
SIGNATURE GATHERING AND STITCHING MACHINE
Filed Sept. 15, 1927   7 Sheets-Sheet 5
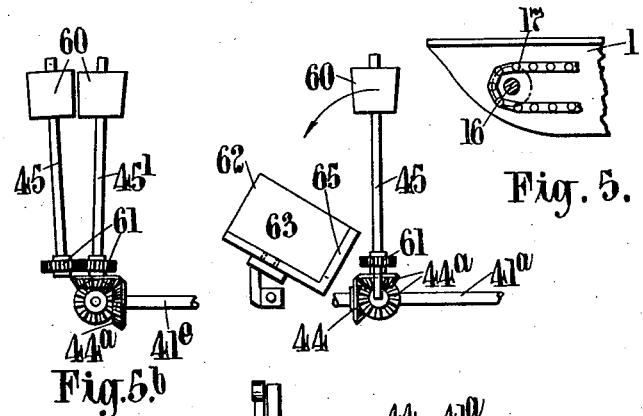
Fig. 5.
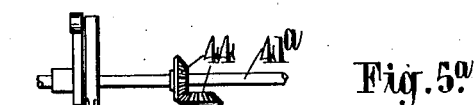
Fig. 5.b
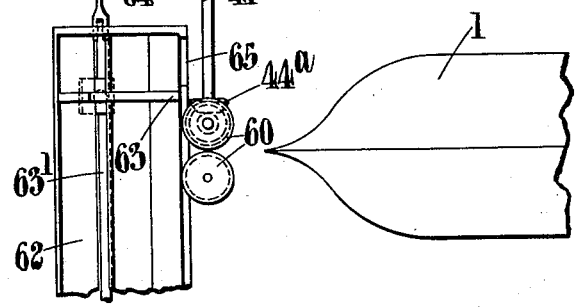
Fig. 5.a
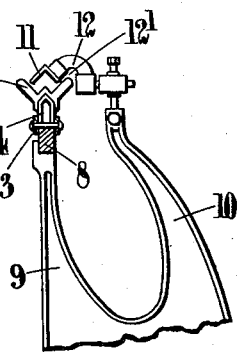
Fig. 6.
INVENTOR:
Oscar Kleinschmit
BY
ATTORNEY

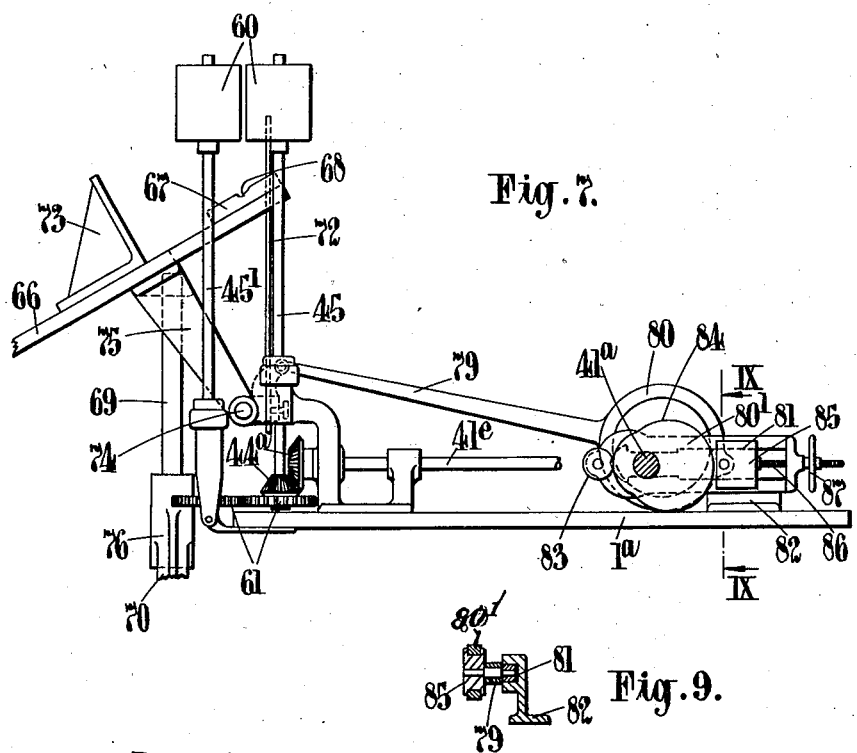

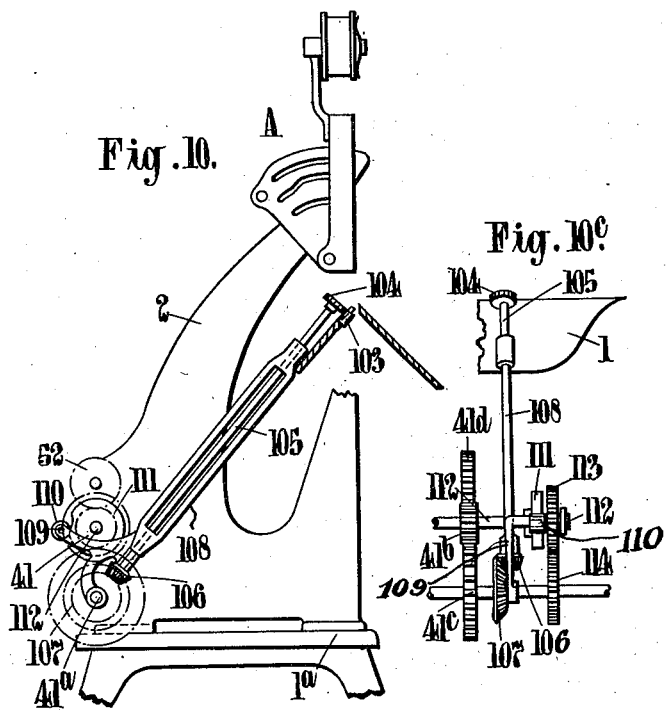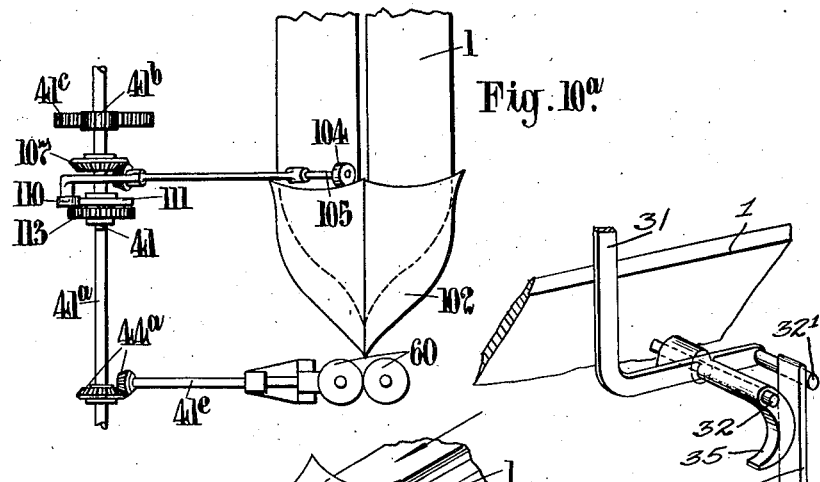

Patented Dec. 10, 1929

1,738,586

UNITED STATES PATENT OFFICE

OSCAR KLEINSCHMIT, OF LEIPZIG-PLAGWITZ, GERMANY, ASSIGNOR TO GEBRUDER BREHMER, MASCHINENFABRIK, OF LEIPZIG-PLAGWITZ, GERMANY

SIGNATURE GATHERING AND STITCHING MACHINE

Application filed September 15, 1927, Serial No. 219,745, and in Germany November 22, 1926.

This invention relates to signature gathering and stitching machines for use in producing books, pamphlets and the like from progressively gathered signatures which are placed astride one over the other and eventually are provided with a cover and bound up by stitching. Machines of this kind are generally well known. One of their chief constituents for gathering individual signatures and for moving the groups of assembled signatures successively to the stitcher devices consists of a chain-like conveyor or saddle of the endless type composed of substantially V-shaped or gable links which at requisite distances are equipped with pusher members adapted during the travel of the conveyor to advance the signatures to be gathered into book form and with a cover therefor to be conveyed towards the stitcher device.

The object of the present invention is to provide improvements enabling the efficiency of machines of this kind to be greatly increased and the manufacturing cost to be materially reduced; and in accordance therewith there is provided, in conjunction with a table-like support on which the signatures are deposited by the gathering conveyor, a second endless conveyor adapted to engage the assembled signatures only at the end of the stitching operation to remove the same from the stitcher device, the said conveyor being, of course, properly co-ordinated in its operation to that of the gathering conveyor proper. Associated with this delivery conveyor is a device for conveying the signatures to the stitching position and whereby, as the gathered signatures are deposited on the stitcher table, they are properly consolidated and registered in the accurate position for stitching, which operation is controllable to enable stitches to be applied in a staggered manner if desired. In their correct position the assembled signatures are employed automatically to operate a controlling device by which, on the position aforesaid being attained, the stitcher device is automatically thrown into action to perform the stitching operation. In conjunction with this arrangement use is preferably made also of a device whereby, if the assembled signatures are not of the correct number, the stacker in the delivery mechanism is operatively controlled so as to prevent faulty books or pamphlets from being delivered and mixed up with the immaculate work.

A simplified and more reliable operation will be found to reside also in the use of a delivery device of a particularly efficient construction associated with the end of the table over which the finished work is discharged.

The above and other minor advantages and improvements will be more fully understood from the following detailed description of the accompanying drawings which represent one form of the improved machine with various constructional embodiments of the different devices above referred to.

Figs. 1 and 1ª jointly illustrate in a more or less diagrammatical representation a side elevation of the main portion of a signature gathering and stitching machine according to this invention with parts of the frame and of the table removed to show the interior.

Fig. 2 is a section on the line II—II of Fig. 1.

Fig. 3 is a section on the line III—III of Fig. 1 to an enlarged scale.

Fig. 3ª is a side elevation of Fig. 3 illustrating the construction and operation of the consolidating or registering slide members.

Figs. 3ᵇ and 3ᵈ show in a view similar to Fig. 2 alternatives of the device shown in Figs. 3 and 3ª for advancing and registering the signatures on the stitcher table.

Fig. 3ᶜ is a view taken at right angles to Fig. 3ᵇ, and

Figs. 3ᵉ and 3ᶠ are details described in connection with Fig. 3ᵈ.

Fig. 4 is a sectional view of a device embodied in the machine approximately on the line IV—IV of Fig. 1 illustrating a detector mechanism (omitted from Fig. 1 for the sake of clearness) for ensuring that the requisite number of signatures shall be in position before stitching.

Fig. 4ª is a side view and Fig. 4ᵇ a plan view thereof.

Figs. 4ᶜ and 4ᵈ are details thereof.

Fig. 5 is a fragmentary view illustrating an alternative of the rollers and other parts shown in Figs. 1, 7 and 8 associated with the delivery mechanism.

Fig. 5ª is a plan and Fig. 5ᵇ is an end view of Fig. 5.

Fig. 6 is a fragmentary detail section on line VI—VI of Fig. 1 illustrating the form of the stationary saddles employed and the manner in which the pusher fingers on the saddle conveyor take their passage through the stationary supporting saddles.

Figs. 7 and 8 are somewhat enlarged end and plan views respectively of the delivery mechanism and its associated parts.

Fig. 9 is a section on the line IX—IX of Fig. 7, and

Figs. 10, 10ª and 10ᵇ illustrate, respectively, a section similar to Fig. 2, a plan view and a detail view of an auxiliary arrangement for use near the delivery end of the table when signatures of relatively stiff paper are to be handled by the machine, Fig. 10ᶜ being a right-angle view of Fig. 10.

Fig. 11 is a perspective view, on an enlarged scale, of a detail.

The machine shown is as usual composed of the signature placing, gathering and forwarding mechanism, the stitcher device proper, a delivery arrangement and the driving and controlling means for the actuation of these devices. The stitcher device is indicated at A in Figs. 1, 2 and 10 and may be of any desired single or multiple stitcher type. It is mounted above a table 1 on a bracket 2 forming part of the main framework of the machine, which is supported on a base plate 1ª. The table 1 on which the gathered signatures are stitched is as shown in Figs. 2 and 3 of gable or V section having its left hand or delivery end preferably tapered as shown in Figs. 5, 5ª, 10ª, and 10ᵇ and its right hand end directly associated with the signature gathering and feeding mechanism B. The latter comprises as its chief constituent an endless conveyor or chain 3, the upper or gathering stretch of which is in line with the apex of the table 1. This chain which as usual is composed of links provided with gable or V-shaped saddle like tops 4 (Figs. 3 and 6) travels in the direction of the arrow a close up to the end of the table 1 whence it is deflected in downward direction over a sprocket wheel 5 and over a lower sprocket wheel 6 is caused to travel in the reverse direction. Certain of the links 4 of the chain 3 are provided with projections or pusher members 7 (Figures 1 and 6) extending angularly from the plane of travel beyond the body of the links. The upper or gathering stretch of the chain 3 travels along a stationary guide 8 which as shown in Figs. 1 and 6 is supported on a number of posts or uprights 9 supporting the frame-work of the gathering mechanism. Secured to a rear arm 10 (Fig. 6) on each of these uprights, above the gathering stretch of the chain 3, is a stationary saddle shaped signature support 11. These stationary saddles serve for the initial placing of individual signatures or layers thereof to be gathered by the gathering stretch of the saddle conveyor or chain 3 and will hereinafter be referred to as emplacements. In the instance shown in Figs. 1 and 1ª, there are four of such emplacements or charging stations, marked E¹, E², E³, E⁴. The configuration of and the manner of mounting the saddles 11 can best be seen from Fig. 6, each saddle being as shown carried by a yoke 12 which is adjustably supported on the arm 10 and provided with a recess 12' for the passage of the pusher members 7 on one side of the gathering chain 3. Pivotally secured above each saddle 11 is a small brake 13 represented in the form of a roller, below which the signatures are held with a slight friction when placed on the saddle 11. Mounted on the shaft 14 which carries the sprocket wheel 5 is a smaller sprocket wheel 15 near the right hand side of the table 1. A companion sprocket wheel 16 is mounted near or in the other end of the table 1 and placed over these two wheels is an endless link chain 17 which as shown travels in the same direction as the gathering chain 3 but at a slightly lower plane below the V-shaped top of the table 1. Some of the links of this chain 17 (in the instance shown, two) are provided with projections 18, preferably on both sides, similar to the projections 7 on the chain 3. These projections 18 are of such length that in their travel with the upper stretch of the chain 17 they project through appropriate slots in the top of the table 1 as shown for instance in Fig. 2.

The object of the pusher members 7 on the gathering chain 3 is to engage any signatures that may be placed on the saddles 11 and to remove them on to the saddle shaped links 4 of the chain, and the object of the fingers 18 on the chain 17 is to move the signatures deposited by the chain 3 on the table 1 from the stitcher device A to the delivery mechanism D at requisite periods as will hereinafter be more fully described. The end of the table 1 which is associated with the gathering chain 3 is shaped as more clearly seen in Fig. 3, having one of its sloping sides somewhat enlarged and provided with an extension 19 for the accommodation of a pusher slide 20 carrying a head 21 sloping to the side facing the direction of the chain 3 (Fig. 3ª) to enable the oncoming signatures readily to slip over the same, the arrangement being such that after the layer of signatures has been transferred on to this end of the table 1 and over the slide 20 by the foremost advancing pusher member 7 on the chain 3, the rear edges of this layer are in front of the registering face of the head 21, which at that moment is actuated to align and consolidate the components of said layer and to register them in the requisite position in which stitching should take place.

The pusher slide 20 is as shown guided in a slot 22 in the enlarged table extension 19 and is connected to an actuating piece 23 by means of a slot 24 and a binding screw 25 in a longitudinally adjustable manner. The piece 23 is in its turn connected at 26 in a similar but vertically adjustable manner to a double armed lever 27 fulcrumed at 28 and adapted to operate the piece 23 and the pusher slide 20 at the requisite moment so that as the signatures are engaged by the head 21 their advance is such as to move them clear of the departing chain pushers 7. For its operation the end of the lever 27 carries a roller 29 in contact with a cam 30, the shaft of which rotates at half the speed of the shaft from which it is driven. This cam has two effective faces 30' and 30'' having each a different throw so as to cause the lever 27 alternately to perform larger and shorter oscillations which are transmitted to the slide 20. Accordingly the assembled signatures on the table 1, as soon as they are clear of the pushers 7, are by the head 21 advanced alternately a different distance under the stitcher heads, causing therefore the staples to be driven in in an alternately offset or staggered relation.

Instead of the arrangement just described, the pusher slide 20, as shown in Figs. 3$^b$ and 3$^c$, can be extended below the stitcher heads to form a mere running support for the signatures, and can co-operate with a roller 21' used in the place of the head 21 and mounted at the end of a lever 22' fulcrumed at 23' and carrying at its other end a roller 24' actuated from a cam 41' on a shaft 41$^a$ of the driving gear explained hereinafter. When the signatures arrive on the table 1 the lever 22' is actuated, causing the roller 21' to bear on the signature layer, so that as the member 23 carrying the pusher slide 20 is moved by the lever 27 a clamping action takes place between 20 and 21' over a certain interval by which the signature layer is properly carried forward to below the stitcher heads. The movement of the support 20 must also in this case be such that before the pusher member 7 advancing the signatures on to the stitcher table disappears, the signature layer has already been drawn forward a little, while the extent of its movement to the stitcher heads should again enable the distance of the staples to be properly controlled. This movement may be regulated either by the adjustment of the configuration of the driving cam or eccentric 41' in order to effect an earlier or later engagement of the roller 21' with the slide 20, or in some other manner such as by a displacement of the sprocket 6 causing the pusher members on the chain 3 either to be relatively advanced or retarded and accordingly the layer to be registered in the correct position determined by the distance of the first stitch from the head or forward end of the layer.

The arrangement shown in Figs. 3$^b$ and 3$^c$ could moreover be modified as shown in Figs. 3$^d$, 3$^e$ and 3$^f$. In this case the roller 21' is rotated as shown by a shaft 21'', driven as in Fig. 3$^f$ from a stud shaft 22'' which in turn derives its movement by bevel gearing and shaft 22$^a$ from a shaft 41 of the driving gear. At the same time the roller 21' is periodically rocked up and down by the cam 41' through an arm 24'' carrying the roller 24' as in Fig. 3$^b$. Use is also made of a slide 20''. Here again, as before, the cam 41' is so shaped as to enable the contact between 21' and 20'' to be timed in the requisite manner, by being made adjustable as indicated for instance in Fig. 3$^e$.

In order to prevent stitching from being performed during idle running or in an incorrect position of signatures on the stitcher table 1, provision is made of a detector device actuated by a lever 31 (Fig. 1) of the bell-crank type pivoted at 32 below the table top. The upright arm of this lever normally projects above the table top, as shown, so as to lie in the path of and be operated by the signatures advancing thereto, and its other or horizontal arm has a bent or curved extension 32' adapted to be brought into engagement with the end of a rocker 33 pivoted at its lower end at 34 to an upright on the base portion of the frame. The rocker 33 is connected at one side by a linkage 46, 47 and a clutch lever 48 to a clutch 48$^a$ mounted on a shaft 52 that carries the driving mechanism for the stitcher device.

The horizontal arm of lever 31 is further provided with a curved, downwardly-directed lug 35, and the upper end of the rocker is normally disposed between said lug and the extension 32'; said rocker being connected, at the opposite side from linkage 46, 47, with a strap 36 (Figs. 3 and 3$^a$) which is operated by a constantly-rotating cam 40 that contacts with a roller 40' carried by the strap. The latter is connected at 37 to the end of a rod 38 which, in turn, is pivoted to an arm 39 on the rocker; and a spring 36' is provided and is connected to the bottom of strap 36 to hold roller 40' engaged with cam 40 and, at the same time, maintain the rocker in its above-mentioned normal position.

At the moment of contact between the vertical arm of the detector lever 31 and the front edge of the signature layer (which is moving toward the left in Fig. 1), the rocker 33 is ready to swing to the right under the influence of spring 36' as soon as this movement is rendered possible by the flat on cam 40 coming opposite roller 40'. Hence, when lever 31 is tilted counterclockwise by the advancing layer, its extension 32' clears the end of the rocker which is thereupon pulled to the right by said spring, thereby throwing in the clutch 48ª and, in consequence, starting the stitcher. As cam 40 continues its rotation, the rocker is pushed back to normal position and, on striking against lug 35, raises the detector lever 31 back again to its first position; the return movement of the rocker reopening the clutch and rendering the stitcher inactive. The aforesaid clutch is of a type adapted to be opened only when the stitcher heads are in their highest position.

The driving mechanism shown comprises a pulley driven shaft 41 (Fig. 1) driving through a set of gear wheels 41ᵇ, 41ᶜ the previously mentioned shaft 41ª journaled in the main frame, also driving by means of a gear wheel 41ᵈ the stitcher clutch shaft 52 above referred to. A conical gear train 42 (Fig. 3) at one end of this shaft 41ª drives a transverse shaft 43, mounted on which is the sprocket wheel 6 previously already referred to for driving the gathering chain 3, the arrangement being such that for each revolution of the shaft 41ª or shaft 43 the chain 3 is advanced to an extent corresponding to the distance of two adjacent pusher members 7 thereon. At its opposite end the shaft 41ª, through a conical gear train 44, a transverse shaft 41ᵉ and conical gear train 44ª (Figs. 7 and 8), drives a pair of upright shafts 45 and 45′ operating the feed rolls 60 of the delivery device D. The controlling cam 40 above referred to is mounted on the shaft 43 and is adapted, as already stated, through the crank strap 36 to operate the lever 33, and through the linkage 46, 47 and 48 to control the stitcher mechanism A by means of the clutch 48ª. Mounted on the shaft 43 is moreover a pinion 49 which is in mesh with a pinion 50 mounted on a stub shaft 51 (see Figs. 1, 3 and 3ª). Mounted on this stub shaft 51 rotatably with the pinion 50 is the cam 30 aforesaid for the operation of the lever 27 controlling the action of the registering pusher slide 20.

The sprocket wheel 5 over which the gathering chain 3 is deflected from its horizontal to its downward direction and the sprocket wheel 15 of the forwarding chain 17 mounted on the same shaft 14, are calculated to impart to the respective chains a relative ratio of speed such as to cause a pusher member 18 on the chain 17 to arrive at the rear of a layer of signatures on the table 1 at the precise moment after stitching and to advance said layer to the delivery devices after the stitcher heads have been lifted therefrom. In practice the sprocket wheels 5 and 15, instead of having a common shaft 14, may be mounted on separate shafts at a certain distance one from the other to prevent adjacent links of the chains 3 and 17 from any possible interference and to enable, if need be, the pusher members thereon to be made as broad as possible for a more reliable and smoother engagement thereof with the edges of the signatures. The operation of the stitcher mechanism, on the actuation of the linkage 46, 47 and 48 and the clutch 48ª on shaft 52 (Fig. 1), is effected through cranks 53 on said shaft which are linked to the stitcher heads by crank rods 54 (Figs. 1 and 2). The shaft 52 is as stated driven from the main shaft 41 through the gear train 41ᵇ and 41ᵈ at the proper ratio of speed which may be variable and adjustable if desired. The shaft 41 rotates at a higher speed than the shafts 41ª and 52. The pulley on shaft 41 is connected to said shaft by a clutch which is connected to and operable by the controlling rod 88 the purpose of which will hereinafter be referred to. The shafts 52 and 41ª may run at different speeds. The higher the speed of shaft 52 compared with shaft 41ª the quicker will be the operation of the stitcher and more time therefore will be left for the transport of the signatures or for the operation of the parts 20 to 30 or those used for a similar purpose according to Figs. 3ᵇ and 3ᵈ.

For properly positioning and guiding the apex of the signature layers on the table 1 holding members 58 are employed above the apex of the table 1 (Fig. 1). These members are shown in the form of rollers provided with grooves conforming to the top of the table and are yieldingly pivoted to the lower end of the stitcher frame by means of rods 59.

Upon the completion of the stitching operations the then oncoming pusher finger 18 advances the stitched signature layer or pamphlet to the previously mentioned pair of rolls 60 forming part of the delivery device D. In order, however, to prevent faulty signature layers or pamphlets from passing to the delivery as immaculate work, provision is made of a controlling mechanism enabling the stacking only of such books as have the required thickness produced by the correct number of gathered signatures. Obviously an arrangement similar to that used for throwing the stitching mechanism in and out of action as above described may be employed but use is made by preference of a device a constructional form of which is shown in Figs. 4 to 4ᵈ. Arranged in a suitable position, say in a plane indicated by the line IV—IV in Fig. 1, between the stitcher device and the table and adjustable in accordance with the thickness of the pamphlet is a feeler 90 which is carried on the end of a two-armed lever 92, 93 pivoted at 94 and adapted to be moved up and down with the stitcher heads through the intermediary of a lever 95. The latter is connected by a pin-and-slot device 95ª to the stitcher heads, so as to be capable of yielding when the feeler 90 contacts with the signatures. The arm 93 of the lever 92, 93 is forked, as shown in Fig. 4, and the ends of such fork carry adjustable means such as screws 93ª cooperating with an arm 96 loosely mounted on the pivot 94 and normally held in the position shown in Fig. 4 by means of a spring. In this position, the blunt-tapered end at the left of such arm is normally opposite the similarly-formed end 97 of an arm 98 carried by a rotatable shaft 98ª, to which is also secured a further arm 98ᵇ so as to form a bell-crank device.

The end of the arm 98ᵇ is secured to a rod 100, which, at its lower end, is enlarged to embrace the shaft 41ª in the manner shown in Fig. 4ᵈ. Such enlarged portion carries a roller 117, held in contact with a cam 116 on the shaft 41ª by means of a spring 118 (Fig. 4). Such cam is circular for the greater part of its periphery but is formed with a depression 116ª, the cam being so set that such depression is adapted to come into register with the roller 117 at the moment when stitching is being effected, i. e., when the feeler 90 is brought down to contact with the signatures. The spring 118 tends to draw the roller 117 into the depression 116ª, and so to lift the rod 100 and thus swing the end 97 of arm 98 towards the arm 96; but if arm 96 has not been moved by the feeler lever, i. e., if the signatures are of the correct thickness, the said end merely contacts with the end of arm 96 and the rod 100 is limited in its movement. Should, however, the signatures be too thin or too thick, the feeler 90 will be correspondingly caused at its forked end 93 to move the arm 96 either above or below the normal position shown, and in such case the end 97 will not be stopped by the end of said arm, and the roller 117 will be drawn completely into the depression 116ª under the action of the spring 118. The movement of said roller is then sufficient for a projecting pin 119 which it carries to contact with a pin 120 which controls in any suitable manner the pawl of a ratchet clutch 121, or any other suitable device by which the drive of the stacking device of the delivery mechanism hereinafter described is controlled. For this purpose the clutch is arranged to couple the driving means for the rod 64 or 79 of the stacking device, hereinafter more fully explained, to the shaft 41ª; and in the example shown the clutch is arranged to couple an eccentric 80 and associated parts to said shaft to control the rod or pitman 79.

The pawl or like controlling device mentioned is under the control of a spring or the like, so that the clutch may again be brought into operation as soon as the roller 117 is withdrawn from the depression 116ª in the cam 116, the arrangement being, however, so timed that the inoperative period of the clutch is sufficient to allow a faulty set of signatures to be delivered, and to be subsequently separated from the signatures of correct thickness in the manner to be described.

The rolls 60 above referred to may as shown in Figs. 5, 5ª and 5ᵇ be slightly conical or axially inclined to one another on their upright shafts 45 and 45′. They are driven as previously stated from the shaft 41ª through a conical gear train 44, a shaft 41ᵉ and a gear train 44ª, their lower ends being connected by intermeshing gear wheels 61. The axial inclination of the rolls 60 enables the stitched work in its passage therethrough to be delivered on edge into a kind of trough 62 in which it is advanced, stacked and consolidated by a slide 63, reciprocated on a guide 63′ by means of a crank rod 64 from the shaft 41ª (Fig. 5ª). As shown in Fig. 5 the collecting trough 62 is provided with an opening 65 which may be adjustable by means of a register or the like to suit the size of the work. The actuation of the slide 63 is such as to cause any faulty pamphlets to be delivered to the trough 62 but to the rear of the slide 63 so as to be stacked to the opposite side and segregated from the correct pamphlets stacked in front of the slide. Instead of using a trough 62 for the delivery and stacking of the pamphlets, use may be made of an oblique delivery board 66 and of delivery rolls 60 which are purely cylindrical and again operated by the stub shaft 41ᵉ driven from the shaft 41ª. In this construction, shown in Fig. 1 and on an enlarged scale in Figs. 7, 8 and 9, after the stitched work or pamphlet has been seized by the rolls 60 it is delivered by them on to the oblique board 66 arranged immediately forward of these rolls on an appropriate level and provided with a plank 67 having a groove 68 adapted to receive the pamphlet. This board 66 is inclined as shown and vertically adjustable with the aid of a hand wheel (not shown) adapted to actuate a vertical spindle 69 movable in any known way in a post 70 through, say, a pair of cog wheels or the like. It is so adjusted as to cause the lower edge of the pamphlet to enter the groove 68 in the plank 67 with the requisite accuracy. As soon as the pamphlet has been discharged from the rolls and is freely standing in the groove in the plank 67, it is acted upon by a rake 71 composed of a number of bars 72 which may be adjustable in their guides. By a sweep of this rake the pamphlet is removed from the groove in the plank 67 over the body of the board 66 and comes to lie against the face of a sliding support 73 which is frictionally guided in any appropriate manner so as to be gradually displaced by the pamphlets delivered against it in succession. The rake 71, 72 is rotatable about an axis 74. Mounted on this axis is a bearing bracket 75 supporting the delivery board 66 and having the upper end of the spindle 69 riveted to it. This spindle is guided in a sleeve 76 on the frame post 70 and is prevented from rotating by any known means such as a key and notch, and the whole of the parts 66 to 75 are therefore rigid with the spindle which can move only rectilinearly when operated by the hand wheel aforesaid. The rake 71, 72 is actuated by means of a pitman 79 forming part of the previously-mentioned eccentric 80 on the shaft 41ª. This pitman may be attached to a guide 80' the rear end of which operates in a slot 81 of a guide block 82 (see Fig. 9) carrying a roller 83; but said pitman is not directly connected to the slotted guide 80' but is attached to a sliding member 85 therein adapted by means of a stem 86 and a hand wheel 87 to be so adjusted as to assume an end position predetermined in some appropriate manner.

The roller 83 is held in contact with a cam 84 on the shaft 41ª by a suitable spring (not shown), so that the movement of the pitman 79 is governed not only by the eccentric 80 but also by the cam and guide mechanism, by which latter the end of the pitman connected to the member 85 is constrained to move horizontally only. If this mechanism were not provided, vertical adjustment of the board 66 and associated parts would appreciably vary the position and timing of the pitman, but such guide mechanism, in constraining the driving end of the pitman to move horizontally, substantially prevents such variations. In addition, adjustment of the member 85 permits positioning of the rods 72 where desired in spite of, for example, angular movement of the pitman that would otherwise occur on adjustment of the board 66.

When as previously explained by reference to Figs. 4–4ᵈ, the clutch 121 is thrown out by the action of the detector or feeder 90, the rake 72 having advanced the preceding correctly assembled pamphlet, the inoperative interval produced continues until the lever 98 has resumed its normal position. During this interval the faulty pamphlet is stitched and delivered; since however the rake bars 72 (or the slide 63) are to the front, the faulty pamphlet comes to lie to their rear and on their return is moved off to the right. A collecting box (not shown) is appropriately placed to receive the faulty work. The inoperative interval is, of course, produced by the clutch hereinbefore described but not indicated in Figs. 5ª and 7–9.

Experience has shown that for the handling of signatures made of comparatively stiff paper it is desirable to effect the delivery of the stitched pamphlet between the delivery rolls 60 by aiding the pusher 18 on the chain 17 in the following manner (see Figs. 10–10ᶜ).

The gap which is left between the left-hand end of the stitcher table 1 and the rolls 60 (Figs. 1 and 4ᵇ) is bridged by a gable or V-shaped guide-piece 102 (see Figs. 10ª and 10ᵇ). Let into the rear face of the table 1, just in front of the rear edge of the guide 102, is a roller 103 (Fig. 10); and associated with this roller is a roller 104 which, while rotating, is adapted to perform also an up and down movement. To this end this roller 104 is mounted on the end of an oblique shaft 105, the other end of which carries a bevel gear 106 meshing with a bevel gear 107 on shaft 41ª. On the shaft 41ª, moreover, is loosely mounted a lever 108, the ends of which constitute sleeve-like bearings for the shaft 105. This lever 108 is provided with an upwardly extending tail piece 109 carrying a roller 110 which is in contact with a cam 111, which is loosely mounted on a stub shaft 112. This stub shaft carries a gear wheel 113 which is in mesh with a gear wheel 114 of equal diameter mounted on the shaft 41ª. The gear wheel 113 and the cam 111 rotate together loosely on the shaft 112, a spring or a like holding element securing the contact between the cam 111 and the roller 110. The stitched pamphlet, after being advanced from the stitcher heads towards the rolls 60 by the pusher 18 on the chain 17, is brought onto the roller 103, the drive above referred to being timed so as to cause the roller 104 at the correct moment to bear on the pamphlet and by its co-operation with the counter-roller 103 to advance it through the guide 102 between the rolls 60.

Briefly summarized in its consecutive stages the operation of the machine is as follows:

At each of the supply stations or emplacements E¹, E², E³, E⁴ an operator is seated placing a signature on her saddle 11 during each revolution of the machine whence it is seized by the oncoming pusher 7 and carried off to and beneath the saddle 11 of the next emplacement. None of the operators at the stations E², E³, E⁴, etc. should place signatures on the saddle 11 of her station unless a signature has been advanced to beneath that saddle from the previous station. The signatures thus successively removed from the consecutive saddles 11 together with the cover that was placed by the operator at the last station over her saddle 11 are advanced in superposition by the then operative pushers 7 on the gathering chain and positioned on the adjacent end of the stitcher table 1 while the pushers referred to pass down with the chain 3 over the sprocket wheel 5. Just a moment before this, the pusher slide 20, 21 at that end of the table is rendered operative, moving the rear ends of the signatures clear of said pushers and pushing against the rear edges of the signatures of the layer now on the table and straightening and positioning the same under the stitcher heads in order that the stitches may be driven in in the correct position. The forward edges of the signatures of that layer are at the same time advanced against the protruding end of the detector lever 31 which is thus tipped down, releasing the control lever 33 which, under the influence of the spring 36', is actuated as already described, throwing the stitcher mechanism into action. As this lever 33 however is caused at once to return to its original position it throws the stitcher machine out of action again ready for the next operation. The stitcher device itself is so constructed that after each stitching action it is automatically brought to rest at a certain point. Immediately upon the completion of the stitching action a pusher 18 on the forwarding chain 17 is brought to the rear of the stitched pamphlet at the very moment the latter is liberated by the stitcher heads and carries it forward over the reduced end of the table 1 (see Fig. 5 or 10ª) into the bite of the rolls 60 by which it is delivered to the trough 63 or to the delivery board 66, according to the delivery device actually employed.

During continuous working, signatures are of course fed in without interruption at all supply stations, the controlling rod 88 attached to the pulley drive already referred to and connected also at each station to a lever 89 being provided to enable the working to be readily arrested from any position on the occurrence of any irregularity in order to avoid wastage.

At the commencement of the operation, until the attendants are all working in a uniform manner and the correct number of signatures has arrived under the respective saddle 11, if it were to happen that incompletely gathered pamphlets are formed on the table as a result of inattention on the part of one or the other of the attendants the operation would be controlled by the action of the detecting device 90 already described by reference to Figs. 4 to 4ᵈ.

With an arrangement as illustrated in Fig. 5ª the defective pamphlet or signature layer would then be caused to drop behind the slide 63 and moved to the rear when the throwout device resumes its normal operation, the immaculate booklets being thus automatically separated from the defective work.

In the example of the machine herein illustrated the improved mechanism has been described more particularly in connection with a signature gathering and stitching machine but it is obvious that it could readily be adopted for other machines of a similar type.

What I claim as my invention is:

1. In a signature gathering and stitching machine a stitcher device, an endless conveyor for gathering signatures in superimposed relation and for conveying them to a support associated with said stitcher device, registering means for consolidating and positioning the said signatures on said support in the accurate position for stitching, and an endless conveyor for moving said signatures over said support from the stitcher device.

2. In a signature gathering and stitching machine a stitcher device, an endless conveyor for feeding assembled signatures from said stitcher device, registering mechanism for consolidating and positioning said signatures in accurate relation to said stitcher device, and means operated when said signatures are in their accurate position for controlling the actuation of the stitcher device.

3. In a signature gathering and stitching machine a stitcher device, an endless conveyor for gathering and conveying assembled signatures to a support associated with said stitcher device, registering mechanism for accurately positioning said assembled signatures in accurate relation to said stitcher device prior to stitching, controlling mechanism operated by said signatures in said accurate position for automatically throwing the stitcher device into action, and an endless conveyor for moving said signatures after stitching over said support away from the stitcher device.

4. In a signature gathering and stitching machine a stitcher device, a support for assembled signatures, an endless conveyor for moving said assembled signatures over said support, registering mechanism for accurately positioning said assembled signatures in accurate relation to said stitcher device, and controlling means for testing the accurate thickness of the layer of assembled signatures before the delivery thereof.

5. In a signature gathering and stitching machine a stitcher device, a support for assembled signatures in relation thereto, registering mechanism for positioning said assembled signatures on the support in their accurate position for stitching, a controlling device operated by said signatures in their accurate position for automatically throwing the stitcher device into action, a controlling device for testing the thickness of the layer of assembled signatures, and means operated thereby for segregating inaccurately assembled work from immaculate work in its passage to the delivery device.

6. In a signature gathering and stitching machine a stitcher device, a saddle shaped table for supporting signatures in their passage to and from said stitcher device, an endless conveyor for gathering and feeding assembled signatures to said table, registering mechanism for positioning said assembled signatures on said table in accurate relation to the stitcher device, an endless conveyor for moving said assembled signatures over said table after stitching, a controlling device for testing the accurate thickness of the layer of stitched signatures on said table, means automatically operated by said layer of signatures in its accurate position for throwing the stitcher device into action and delivery mechanism comprising upright forwarding rolls associated with the delivery end of said table to receive the stitched signatures advanced thereover by said second conveyor.

7. In a signature gathering and stitching machine a stitcher device, a table for supporting assembled signatures in their advance to and from said stitcher device, an endless conveyor adapted to advance said signatures over said table, delivery mechanism associated with the delivery end of said table, and a guide between said delivery end of the table and the delivery mechanism associated with means for assisting said endless conveyor in advancing the assembled signatures to the delivery mechanism through the said guide.

8. In a signature gathering and stitching machine a stitcher device, an endless conveyor composed of saddle-shaped links and signature engaging members for assembling signatures in superimposed relation, stationary saddle emplacements above said saddle shaped links with guide ways for the passage therethrough of said engaging members, a saddle shaped table associated with said stitcher device and said conveyor for supporting the assembled signatures, and an endless conveyor comprising a link chain travelling beneath said table and signature engaging members adapted to project and move through said table for engaging and advancing the signature layers over said table to delivery mechanism.

9. In a signature gathering and stitching machine a stitcher device, a table for supporting assembled signatures in relation thereto, an endless conveyor for gathering and feeding assembled signatures on to said table, an endless conveyor associated with said table for moving the assembled signatures thereover, and driving mechanism common to both said conveyors whereby said conveyors are driven in precise cooperative relationship.

10. In a signature gathering and stitching machine a stitcher device, an endless conveyor provided with signature engaging members for successively gathering and assembling signatures, a table for receiving and supporting said assembled signatures, an endless conveyor provided with engaging members for moving said assembled signatures over said table in timed relation to their stitching, a sliding member situated substantially between said two conveyors and associated with said table for registering the assembled signatures thereon in the stitching position, and driving mechanism whereby said conveyors and said sliding member are actuated in timed relation one with the other.

11. In a signature gathering and stitching machine a stitcher device, a table for supporting assembled signatures, an endless conveyor for feeding assembled signatures onto said table, an endless conveyor associated with said table for advancing the assembled signatures thereover, a register slide for accurately positioning the assembled signatures on the table, a lever gear operated by the assembled signatures in their correct position, and driving mechanism for actuating the said endless conveyors, the registering slide and the stitcher device when said lever gear has been operated by the assembled signatures under the stitcher device.

12. In a signature gathering and stitching machine, the combination of a stitcher device; stationary signature-supporting means; a table associated with the stitcher device; an endless gathering conveyor for assembling the individual signatures and conveying them from said supporting means to said table; a second endless conveyor disposed beneath the table in alignment with the gathering conveyor to engage the assembled signatures after stitching and remove them from the stitcher device; and means for actuating said second conveyor in timed relation with the gathering conveyor.

13. In a signature gathering and stitching machine, the combination of a stitcher device; stationary signature-supporting means; a table associated with the stitcher device; an endless gathering conveyor for assembling the individual signatures and conveying them from said supporting means to said table; means for engaging the signatures after they have been deposited on said table to register them in the requisite position; and a separate conveyor, independent of said engaging means, for removing the stitched signatures from the stitcher device.

In testimony whereof I have hereunto signed my name this thirtieth day of August 1927.

OSCAR KLEINSCHMIT.